United States Patent [19]
Woersinger

[11] Patent Number: 4,966,036
[45] Date of Patent: Oct. 30, 1990

[54] AIR FLOW RATE METER

[75] Inventor: Juergen Woersinger, Maulbronn, Fed. Rep. of Germany

[73] Assignee: Robert Bosch GmbH, Stuttgart, Fed. Rep. of Germany

[21] Appl. No.: 459,177

[22] Filed: Dec. 29, 1989

[30] Foreign Application Priority Data

Mar. 3, 1989 [DE] Fed. Rep. of Germany ....... 3906833

[51] Int. Cl.$^5$ ................................................. G01F 1/68
[52] U.S. Cl. ............................... 73/204.22; 73/118.2; 73/204.27
[58] Field of Search ............... 73/118.2, 202.5, 204.27, 73/204.22

[56] References Cited

U.S. PATENT DOCUMENTS 4,299,724 11/1981 Knapp et al. .
4,561,302 12/1985 Sumal et al. ........................ 73/118.2

FOREIGN PATENT DOCUMENTS 2845662 5/1980 Fed. Rep. of Germany .
3804797 8/1989 Fed. Rep. of Germany .

Primary Examiner—Herbert Goldstein
Attorney, Agent, or Firm—Edwin E. Greigg

[57] ABSTRACT

In air flow rate meters having a substrate body that protrudes into the air intake tube of an internal combustion engine and has openings in which hot wires are deployed over support points, the problem arises of reducing the heat losses caused by the support points. By disposing a frame body (4) on the substrate body (1) and embedding the connection wires (23, 42) and the linking wire (32), all of which have a very small cross section and serve to electrically connect the hot wires (28, 36), the heat losses to the support points (26, 30, 34, 38) can be reduced. The air flow rate meter is suitable for measuring the mass of aspirated air in internal combustion engines.

4 Claims, 1 Drawing Sheet 4,966,036

AIR FLOW RATE METER

BACKGROUND OF THE INVENTION

The invention is directed to improvements in air flow rate meters.

An air flow rate meter has already been proposed (co-pending U.S. application Ser. No. 281,717) in which the problem arises that although the ends of the individual hot wires are electrically conductively connected to support points made from this wire, these support points in turn are connected to strip-shaped conductor leads embedded in the substrate body. The result is an undesirable heat loss from the hot wire to the conductor lead, which not only undesirably affects the measurement findings but also causes a heat loss when the hot wire is burned off to clean it; as a result, the ends of the wires do not attain a sufficiently high temperature in the vicinity of the support points for particles that have been deposited there to burn off as desired.

OBJECT AND SUMMARY OF THE INVENTION

It is a principal object of the invention to provide an air flow rate meter having the advantage over the prior art of lessening the heat losses from the hot wire to the support points, thereby increasing the effectiveness of the burnoff process after measurement operation and thus providing for an improved outcome of measurement and a longer service life for the air flow rate meter.

It is another object of the invention to provide that because the openings in the frame and in the substrate are embodied with a rectangular cross section, a slender form for both the substrate body and frame body is possible.

It is yet another object of the invention and very advantageous to provide at least one guide tang on the substrate body, engaging a guide opening of the frame body and centering it, so that the substrate body and frame body can advantageously be connected together by at least one rivet connection.

The invention will be better understood and further objects and advantages thereof will become more apparent from the ensuing detailed description of a preferred embodiment taken in conjunction with the drawings.

DESCRIPTION OF THE EXEMPLARY EMBODIMENT

Figure 1:
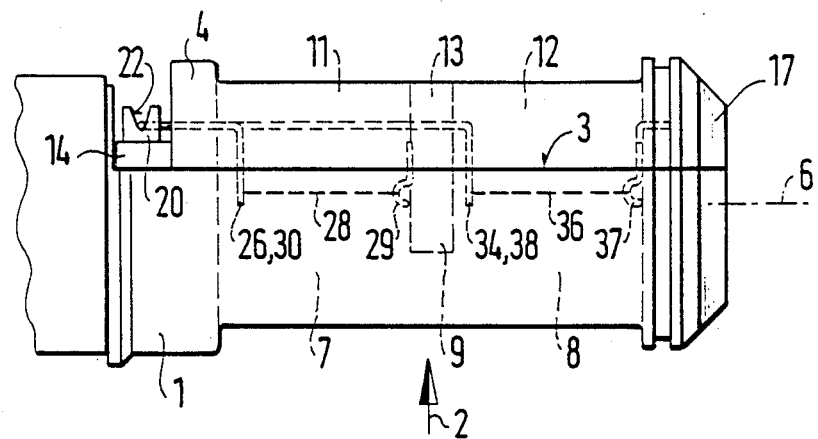
FIG. 1 is a fragmentary side view of an air flow rate meter embodied in accordance with the invention.
Figure 2:
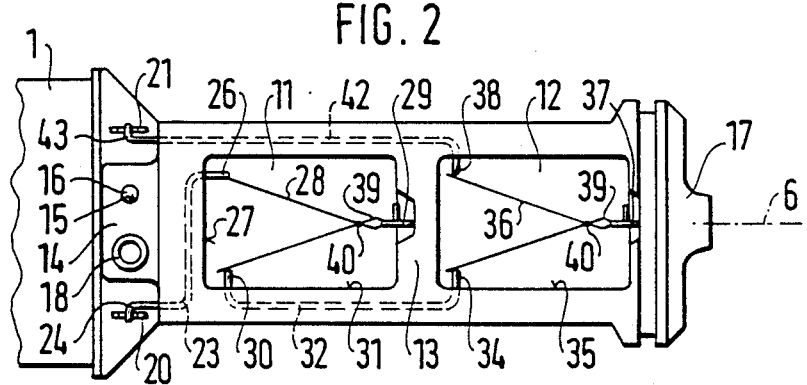
FIG. 2 is a plan view of an air flow rate meter embodied in accordance with the invention.

A fragmentary view of an air flow rate meter is shown, in side view in FIG. 1 and in plan view in FIG. 2. This flow rate meter is used to measure the aspirated air mass in internal combustion engines, and its function and use are equivalent to what has already been described and shown in co-pending U.S. patent application Ser. No. 281,717 to Gneiss. The air flow rate meter of FIGS. 1 and 2 has a substrate body 1, which protrudes through a wall, not shown, of an air intake tube of the engine directly into the primary flow conduit or, in a known manner, into a bypass conduit around the air intake tube. The air flow is in the direction of the arrow 2 in the plane of the drawing in FIG. 1, and from the plane of the drawing outward in FIG. 2. Transversely to the air flow direction 2, the substrate body 1 is provided with a recessed bearing surface 3, onto which a frame body 4 is applied, the outer contour of which is flush in the air flow direction 2 with that of the substrate body 1. The substrate body 1 and frame body 4 are embodied as plastic injection molded parts. The substrate body 1 and frame body 4 are joined together, preferably so as to form a slender cylinder, with a horizontally extending longitudinal axis 6. A first substrate opening 7 on the left and a second substrate opening 8 on the right are formed in the air flow direction 2 in the substrate body 1, located in the direction of the longitudinal axis 6; over at least a part of their length in the air flow direction 2, these openings are separated by a web 9 of the substrate. A first frame opening 11 is embodied in alignment with the first substrate opening 7, in the frame body 4 on the left, and a second frame opening 12 is formed on the right, in alignment with the second substrate opening 8. The first frame opening 11 and second frame opening 12 are separated from one another by a web 13 of the frame. Each of the openings 7, 8, 11, 12 preferably has a rectangular cross section, with the side walls that extend parallel to the flow direction 2 being longer than the end faces of these openings that extend transversely to the longitudinal axis 6.

On at least its left end, the frame body 4 has a fastening protrusion 14, which is provided with a guide opening 15, through which a guide tang 16, protruding from the bearing surface 3 of the substrate body 1, reaches when the frame body 4 rests on the substrate body 1, so that centering of these two parts and thus of the openings to one another as well takes place. A further guide opening (blind bore) and a guide tang are located on the free end 17 of the substrate body 1 and frame body 4, but have not been shown in the drawing. The frame body 4 may be fastened to the substrate body 1 by heating the guide tang 16 and forming a head that extends over the guide opening 15; this is merely an example. Secure connection of the frame body 4 to the substrate body 1 may also be attained by embedding a metal rivet body 18 by one end in the substrate body 1, while the other end of the rivet protrudes out of the bearing surface 3 in the vicinity of the fastening protrusion 14 and through a guide opening of the fastening protrusion 14 and is riveted to it.

Remote from the free end 17, a first connection lug 20 and a second connection lug 21 protrude from the region of the bearing surface 3 of the substrate body 1 not covered by the fastening protrusion 14 of the frame body 4; the lugs 20 and 21 are spaced apart from one another. Each of the connection lugs 20, 21 has a notch 22 open toward its end. In a manner not shown, the connection lugs 20, 21 are electrically conductively connected to a plug connection provided on the substrate body 1, for the sake of supplying current and emitting signals. A first electrically conducting connection wire 23 is embedded in the frame body 4 and protrudes by a first connection end 24 from the frame body 4 at the fastening protrusion 14, in such a manner that this first connection end 24 engages the notch 22 of the first connection lug 20 and can be connected to it in an electrically conductive manner, for instance by soldering. With a support point end 26, the first connection wire 23 also protrudes from an end face 27, oriented toward the fastening protrusion 14, of the first frame opening 11 and is bent into a hook in such a way that the support point end 26 extends into the first substrate opening 7. One end of a first hot wire 28 is electrically conductively connected to the support point end 26 and is guided in a V over a middle support point 29 to a first support point end 30 and electrically connected to this first end 30. The middle support point 29 is embedded in the frame web 13 and protrudes, bent into a hook, into the first frame opening 11 and the first substrate opening 7. The first support point end 30 acts as one end, protruding out of a side face 31 of the first frame opening 11, of a linking wire 32 embedded in the frame body 4 and extends, bent into a hook, into the first frame opening 11 and the first substrate opening 7. The first hot wire 28 is guided by the support points 26, 29, 30 in such a way that when the frame body 4 is mounted on the substrate body 1 this hot wire extends approximately horizontally in the first substrate opening 7. The support point end 26 of the first connection wire 23 and the first support point end 30 of the linking wire 32 are located on different sides of the longitudinal axis 6.

With a second support point end 34, the linking wire 32 protrudes, bent into a hook, for instance out of a side face 35 aligned with the side face 31 into the second frame opening 12 and the second substrate opening 8. One end of a second hot wire 36 is electrically conductively connected to the second support point end 34 and guided in a V via a middle support point 37 to one support point end 38 and electrically conductively secured to that end, for instance by soldering. The middle support point 37 is embedded at the free end 17 of the frame body 4 and, bent into a hook, protrudes into the second frame opening 12 and the second substrate opening 8. The middle support points 29, 37 are located approximately on the longitudinal axis 6. When the frame body 4 is mounted on the substrate body 1, the second hot wire 36 is guided by the support points 34, 37, 38 in a horizontal plane extending inside the second substrate opening 8. Each hot wire 28, 36 is guided in the form of a loop 39 over each middle support point 29, 37, respectively. Suspension of a hot wire in this way by means of a loop is already known from German Pat. No. 28 45 662, so no further description of it need be provided here. The two intersecting wire segments of each loop 39 of each hot wire 28, 36 are soldered together at their intersection 40.

The second support point end 34 and the support point end 38 of a second connection wire 42 embedded in the frame body 4 are located on different sides of the longitudinal axis 6. The second connection wire 42 protrudes with a second connection end 43 from the frame body 4 in the region of the fastening protrusion 14 in such a manner that it engages the notch 22 of the second connection lug 21 and can be electrically conductively connected to the second connection lug 21. The hot wires 28, 36 are thus connected electrically in series. The first connection wire 23, the linking wire 32 and the second connection wire 42, along with the middle support points 29 and 37, have a very small diameter of approximately 0.4 mm, so that the heat losses from the hot wires 28, 36 to the support points 26, 29, 30, 37, 38 are as low as possible. Such heat losses arise not only during normal measurement operation of the air flow rate meter, but also in the so-called burnoff process, as described for instance in U.S. Pat. No. 4,299,124 to Knapp et al, so that not only is the measurement signal per se improved, but it is also assured that deposits on the hot wires can be burned off sufficiently well during the burnoff process, even in the vicinity of the support points.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the Uunited States is:

1. An air flow rate meter for measuring the aspirated air mass of internal combustion engines, having a substrate body extending transversely to an air flow direction and made of plastic, which has a first substrate opening extending parallel to the air flow direction, in which a first hot wire is disposed in a V-shape and retained by support points so that each of its ends is connected to a separate support point, said first hot wire further being formed with a loop via intersecting wire segments which are electrically conductively connected together, said first hot wire retained between its ends by means of at least one middle/support point that protrudes through the loop, a second substrate opening being provided adjoining the first substrate opening in the substrate body in a direction corresponding to a longitudinal axis of the substrate body and being separated from the first substrate opening by a web of the substrate body and likewise extending parallel to the air flow direction, a second hot wire being disposed in said second substrate opening and electrically connected to the first, said second hot wire also being disposed between support points in a V shape so that each of its ends is connected to one each support point, said second hot wire further being formed with a loop via intersecting wire segments which are electrically conductively connected together, said second hot wire retained between its ends via at least one middle support point protruding through the loop, and transversely to the substrate openings, the substrate body has a bearing surface on which a frame body made of plastic rests, said frame body having a first frame opening in alignment with the first substrate opening and a second frame opening in alignment with the second substrate opening, the first frame opening and the second frame opening being separated by a web of the frame body, a first electrically conductive connection wire and a second electrically conductive connection wire are embedded in the frame body the first connection wire protruding out of the frame body, with a first closure end which is electrically conductively connected to a first connection lug protruding from the substrate body, said first connection wire having a support point end bent into a hook shape further protruding into the first frame opening and the first substrate opening where it is electrically conductively connected to one end of the first hot wire the other end of the first hot wire being electrically conductively connected to a first support point end of a linking wire, said first support point end being bent into a hook shape so as likewise to protrude into the first frame opening and the first substrate opening said linking wire being embedded in the frame body so as to protrude with a second support point end bent into a hook shape into the second frame opening and the second substrate opening where it is electrically conductively connected to one end of the second hot wire, the other end of the second hot wire being electrically conductively connected to a support point N of the second connection wire, this support point N being bent into a hook shape so as to protrude into the second frame opening and the second substrate opening, the second connection wire being arranged to protrude from the frame body with a second connection end, which end is electrically conductively connected to a second connection lug protruding from the substrate body.

2. An air flow rate meter as defined by claim 1, further wherein the frame openings and the substrate openings have a substantially rectangular cross section.

3. An air flow rate meter as defined by claim 1, further wherein at least one guide tang protrudes from the bearing surface of the substrate body and reaches into a guide opening of the frame body for centering purposes.

4. An air flow rate meter as defined by claim 1, further wherein the substrate body and the frame body are joined together by means of at least one rivet connection.

* * * * *